United States Patent [19]

Beaumont et al.

[11] Patent Number: 4,477,834
[45] Date of Patent: Oct. 16, 1984

[54] SCAN CONVERSION CIRCUIT

[75] Inventors: David A. Beaumont; Michael A. King, both of Camberley, England

[73] Assignee: The Marconi Company Limited, United Kingdom

[21] Appl. No.: 380,610

[22] Filed: May 21, 1982

[30] Foreign Application Priority Data

May 29, 1981 [GB] United Kingdom ............... 8116450

[51] Int. Cl.³ .............................................. H04N 5/33
[52] U.S. Cl. .................................. 358/113; 250/332; 250/334; 358/140
[58] Field of Search .............. 358/140, 113; 250/332, 250/334

[56] References Cited

U.S. PATENT DOCUMENTS 4,158,137  6/1979  Menke ................................. 250/332
4,399,464  8/1983  Hix ..................................... 358/113
4,403,148  9/1983  Coon .................................. 358/113

FOREIGN PATENT DOCUMENTS 1394825  3/1965  France .

Primary Examiner—Howard W. Britton
Attorney, Agent, or Firm—Kirschstein, Kirschstein, Ottinger & Israel

[57] ABSTRACT

A scan conversion circuit for a thermal imager device in which a field is scanned by a parallel-series array of infra-red detectors swept broadside over the field to produce a band of parallel I.R. signals. The signals from the array of detectors are sampled at high speed in a pattern which traces each parallel line of detectors in turn. A C.R.T. is scanned in a similar pattern, the pattern being repeated at high speed with successive lateral displacements corresponding to the rate at which the I.R. array sweeps the field.

8 Claims, 10 Drawing Figures

SCAN CONVERSION CIRCUIT

This invention relates to scan conversion circuits and particularly to such circuits for coordinating the scanning of a cathode ray tube (C.R.T.) display with the scanning of an object or target field with an optical detector array.

Infra-red image converters, or 'thermal imagers', are known in which an array of infra-red sensitive detectors is in effect scanned over the object field repetitively, the signals from the detectors being arranged to modulate the visual elements of a display and thus convert the infra-red (I.R.) image to a visual image.

Scanning of the object field may be achieved without movement of the detectors by means of rotating mirrors or prisms so that different parts of the object field are successively focussed on the array. In principle a single detector element could be used and this would in fact greatly simplify the ensuing signal processing and visual reproduction. However, the demands on the scanning mechanism and signal processing would be excessive, e.g. greatly increased speed and short dwell times on each field element.

It has therefore been proposed to use an array of detector elements, which, in the simplest arrangement would comprise a single column of detectors swept (in effect) broadside across the object field. Sixteen such detector elements would then reduce the 'time base' frequency by sixteen times. The whole object field is then covered by a plurality, say ten, such swathes, each comprising sixteen lines, the swathes being arranged adjacent each other to cover the field uniformly.

It may be desirable to enhance the signal output by, in effect, 'repeating' the detector one or more times at intervals in the sweep direction, i.e., by providing a series of detectors in the sweep direction. Such a series of detectors provide signals sequentially from the same field element, the sequential signals then being stored and added. Such operation is known as serial mode operation and is of course independent of the parallel mode operation whereby a column of detectors sweep the field in parallel. A combination of the two is known as parallel-serial mode operation.

The two directions in the field, i.e. the direction of the sweep and the transverse direction perpendicular to the sweep will be referred to herein as the serial and parallel directions accordingly.

An alternative reason for 'serialising' the detectors is to achieve greater resolution in the parallel direction. The physical size of the detector elements imposes a limit on the closeness of the scan lines. By displacing detector elements serially, they can be disposed more closely in the parallel direction. The scan lines for one column of detectors can thus be interlaced with those of an adjacent column.

Such an arrangement still constitutes a parallel-serial mode at least for the purposes of the present specification.

A difficulty that arises in converting the detected object image to a displayed image, particularly on a C.R.T., is that storage of signals is normally required to bring the serial detector signals back 'into line' for the purposes of simultaneous display. Such storage incurs a penalty in terms of cost, weight and power and is particularly onerous in hand-held thermal imagers.

An object of the present invention is therefore to alleviate the display difficulties that arise as discussed above, in connection with parallel or parallel-serial detector operation.

According to the present invention, in a scan conversion circuit adapted to accept signals from an array of detector elements arranged to scan a field of view in a parallel-serial mode, the scan conversion circuit providing scanning signals for a cathode ray tube (C.R.T.) display, the scan conversion circuit comprises a deflection circuit adapted to provide a C.R.T. scan raster which is a high speed trace of the pattern of the array repeated a multiplicity of times with respective small displacements in a direction and at a rate corresponding to the serial scan of said array, the scan conversion circuit also comprising means for supplying a C.R.T. brightness signal corresponding to the signal arising from the detector element to which said trace corresponds at any particular time.

The scan conversion circuit may be adapted to provide a scan raster which traces successive parallel sections of the array in sequence, each of the small displacements corresponding to a small fraction of the displacement between said successive parallel sections.

Successive parallel sections of the scan raster may be displaced in the parallel direction to accommodate an array of detector elements in which successive parallel sections are similarly displaced to provide line interlacing.

The deflection circuit is preferably adapted to produce digital deflection signals such that the C.R.T. scan pauses at each point corresponding to a detector element.

The multiplicity of raster traces may constitute a swathe forming part of the C.R.T. field, the deflection circuit being adapted to repeat the swathe a number of times, so that the swathes lie adjacent to each other in the parallel direction to form a uniform complete C.R.T. field in correspondence with the field scanned by the array of detector elements.

Image conversion means may comprise an array of optical detector elements, means for scanning an object field with the array in a parallel-serial mode, and a scan conversion circuit as aforesaid to provide C.R.T. deflection signals and brightness modulation signals accordingly.

A scan conversion circuit and image conversion means incorporating such a circuit will now be described, by way of example, with reference to the accompanying drawings, of which:

Figure 1:
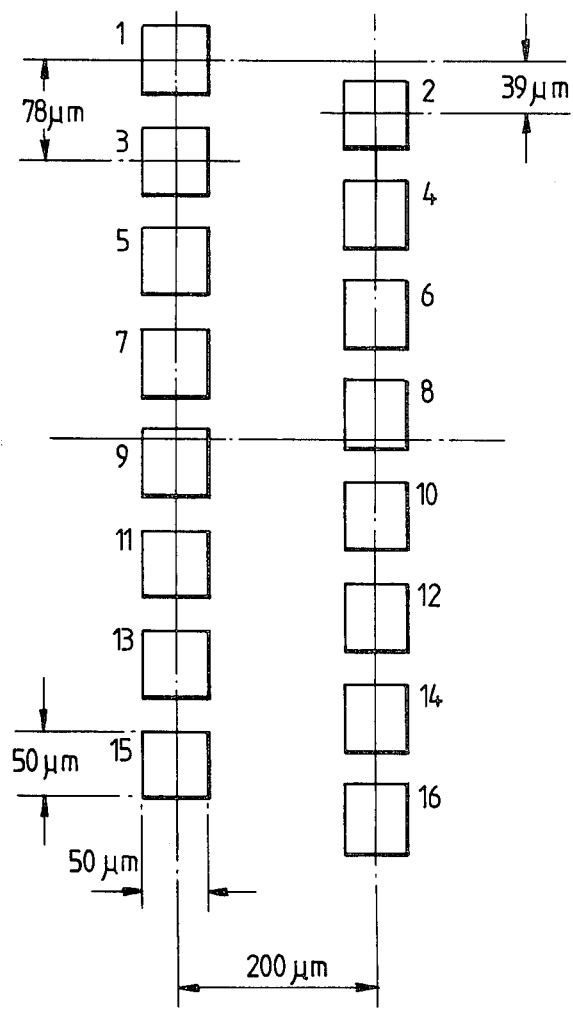
FIG. 1 is a diagram of a detector element array.

Referring to FIG. 1 of the drawings, this shows, to a greatly enlarged scale, an array of sixteen infra-red detector elements arranged in two columns. The array is mounted in a thermal imager device, of the kind described, for example, in UK Patent Application No. 2057811 or 2057812.

The array in effect sweeps across the object field broadside, producing two sets of detector signals each set comprising eight signals in parallel. The so called 'parallel direction' is thus vertical in FIG. 1. The two columns detect the same vertical line of object field in sequence and displaced in time. This is therefore a parallel-serial array, the serial direction being horizontal in the Figure.

Greater resolution in the vertical direction is achieved by interlacing the detectors of one column with those of the other. The resulting scan lines can thus be made closer together than with a single column. A convenient value for the serial displacement of the two columns is $200\mu$, the pitch of the detectors within each column being $78\mu$. The second column is therefore displaced downwardly from the first column by $39\mu$.

A varying signal voltage is derived from each detector in dependence upon the level of infra-red radiation to which it is subjected as it scans the object field. It is required to display a visual representation of these signals to form a picture of the original object field.

In order to achieve this, the C.R.T. raster is formed as a succession of high-speed traces of the array pattern, each trace being displaced in the serial direction of the array by a small distance corresponding to the scan rate of the array. This is illustrated in FIGS. 2 and 3.

Figure 2:
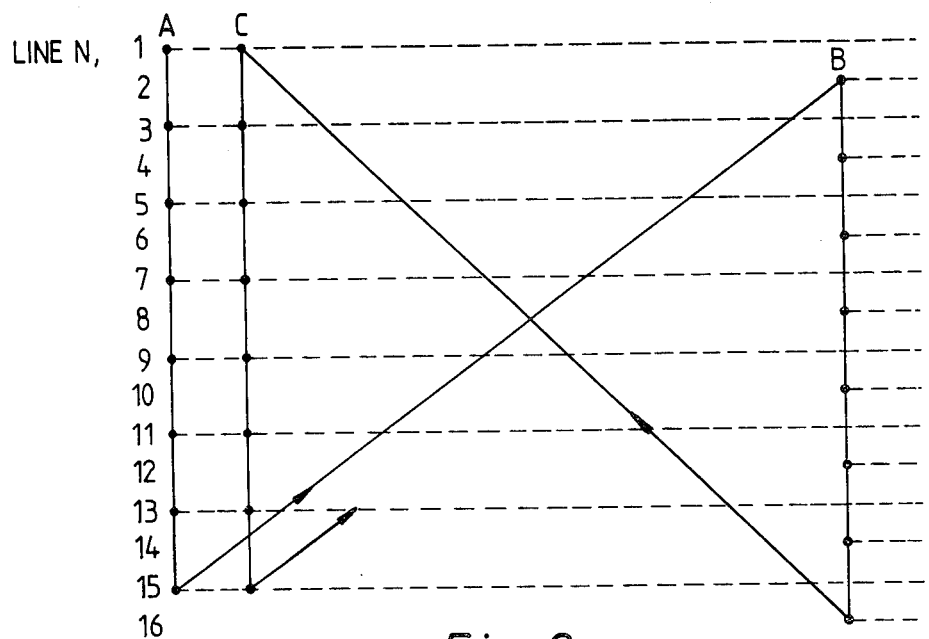
FIG. 2 is a diagram of a single scanning trace of the array of FIG. 1.
Figure 3:
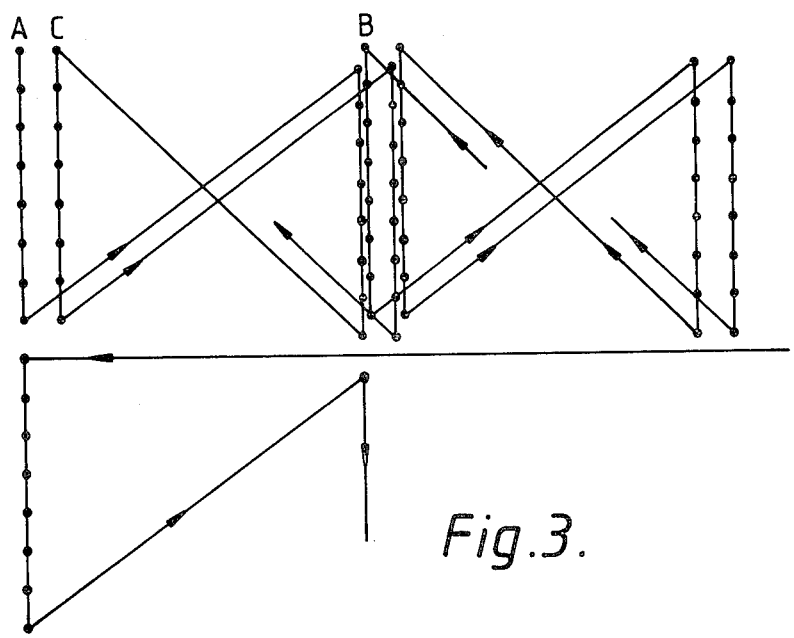
FIG. 3 is a similar diagram illustrating a multiplicity of sequential such traces.

In FIG. 2 the two columns of detector elements are represented (initially) below points A and B, the diagram not being to scale. The A column comprises eight detectors which sweep lines 1, 3, 5 . . . 15 of the I.R. field, and the B column comprises eight detectors which sweep lines 2, 4, 6 . . . 16 of the I.R. field. One swathe of the I.R. field is constituted by one sweep of the array of detectors along lines 1–16 in parallel.

The C.R.T. raster is arranged (as will be explained) to trace the pattern of the array at a high speed relative to the overall scan rate in the serial direction. At the start of the active part of swathe 1, the C.R.T. spot begins at A in FIG. 2. The spot is deflected downwards a total distance equivalent to 14 display lines, pausing on alternate lines, representing the scanning of one column of 8 detector elements. The spot is then deflected diagonally upwards to point B, which is one display line below A and horizontally displaced from A by a distance equivalent to the detector column separation. The spot then moves vertically downwards as before, a distance equivalent to 14 display lines before returning diagonally to point C, level with, and separated in the scan direction by one "picturepoint" from A. This represents one sample of the detector array, and is repeated 511 times to complete one swathe. FIG. 3 shows how the samples of the two detector columns are interlaced to provide the 16 lines per swathe.

During the scanner dead time between swathes the CRT spot moves to point D which is sixteen display lines below A. The pattern described above is then repeated for swathe two and the eight subsequent swathes. This completes the frame and the spot returns to A.

Figure 4:
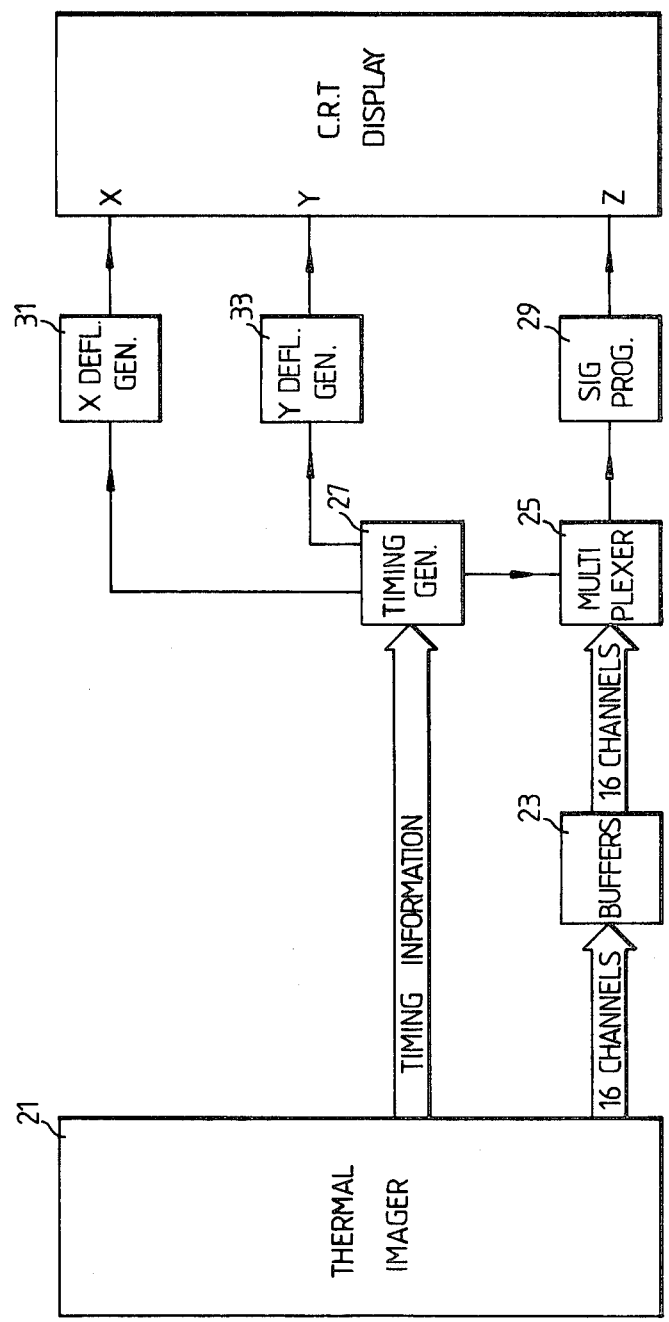
FIG. 4 is a block diagram of an image conversion system.

Referring now to FIG. 4, the system will be described more generally before reverting to the generation of the C.R.T. raster signals.

A thermal imager 21 provides 16 channel signals from the 16 I.R. detectors as described above. These are applied to 16 buffer amplifiers 23 and then to a multiplexer circuit 25 where the 16 channel signals are converted to serial samples. Timing signals are derived from a timing generator 27 so that the serial samples are synchronised with the C.R.T. raster scan. After processing by circuitry 29 the channel samples are applied to the C.R.T. modulation input, Z.

Timing information is derived from the thermal imager and ideally consists of start-of-swathe pulse and a start-of-frame pulse. Alternatively, these pulses are produced within the timing generator by decoding pulses from the scanning motor of the I.R. scanner.

X and Y deflection generator circuits 31 and 33 are synchronised by the timing generator with the multiplexing process, the deflection signals then being applied to the C.R.T.

Figure 5:
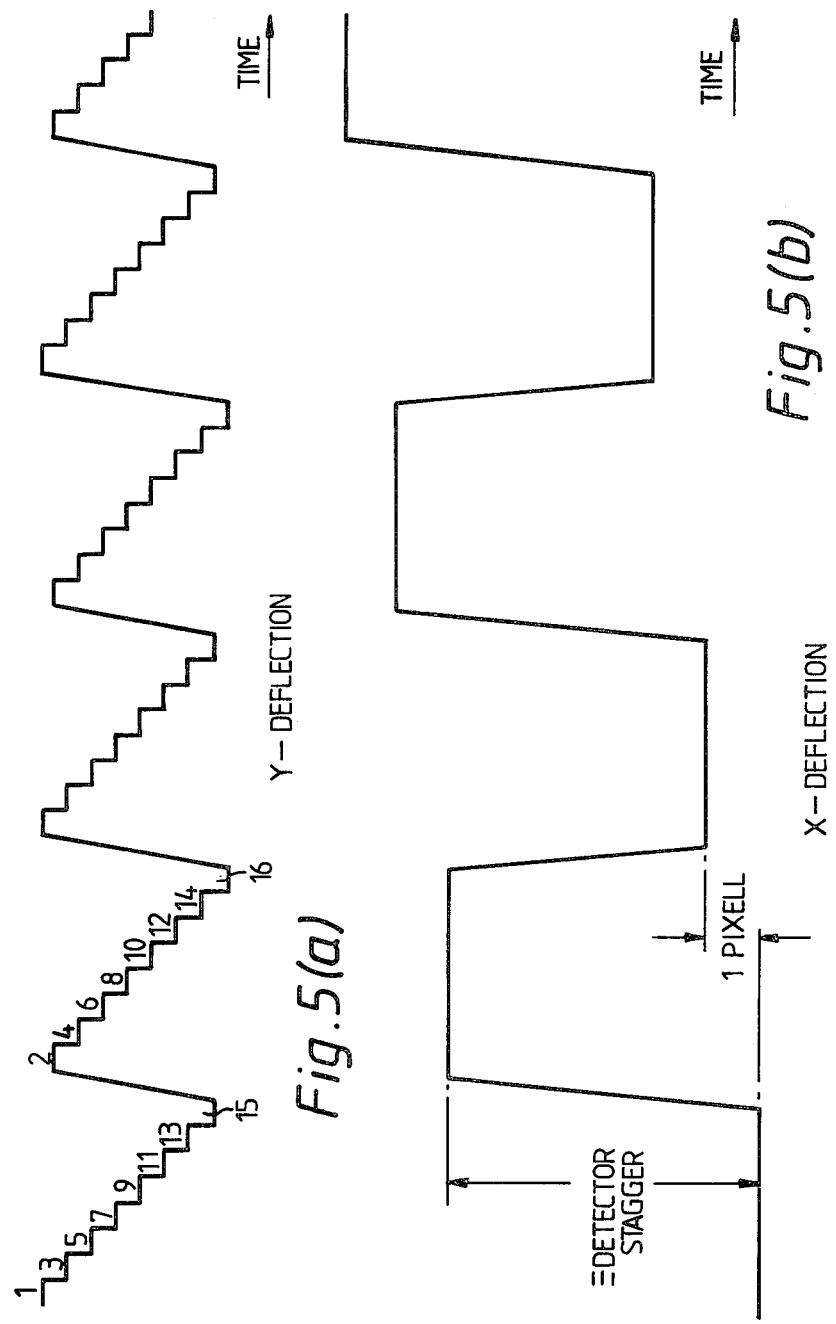
FIG. 5(a) is a wave form diagram illustrating the X-deflection waveform output of the scan conversion circuit.
FIG. 5(b) is a waveform illustrating the Y-deflection waveform output of the scan conversion circuit.

Referring now to FIG. 5, this shows the two deflection signals required for the C.R.T. raster. It can be seen that the X-deflection waveform oscillates about a steadily increasing mean value and the Y-deflection waveform is a stepped triangular waveform having two periods per repeating unit of the X-waveform. From FIG. 3 it can be seen that the Y deflection requires a series of eight pauses on column A, a flyback to line 2 in column B, eight pauses on column B and a flyback to line 1. Each series of eight pauses is shown as a 'staircase' in FIG. 5, one staircase extending from line 1 to line 15 and the next from line 2 to line 16. This sequence is repeated throughout each swathe, the whole waveform being displaced vertically by a distance equivalent to 16 display lines between swathes. Thus, there are two essentially separate operations—one is the intra-swathe staircase as shown in FIG. 5(a), and the other is the inter-swathe staircase with a "step" of 16 display lines. These are referred to in FIG. 8 as the "staircase generator" and "swathe counter" respectively.

Figure 6:
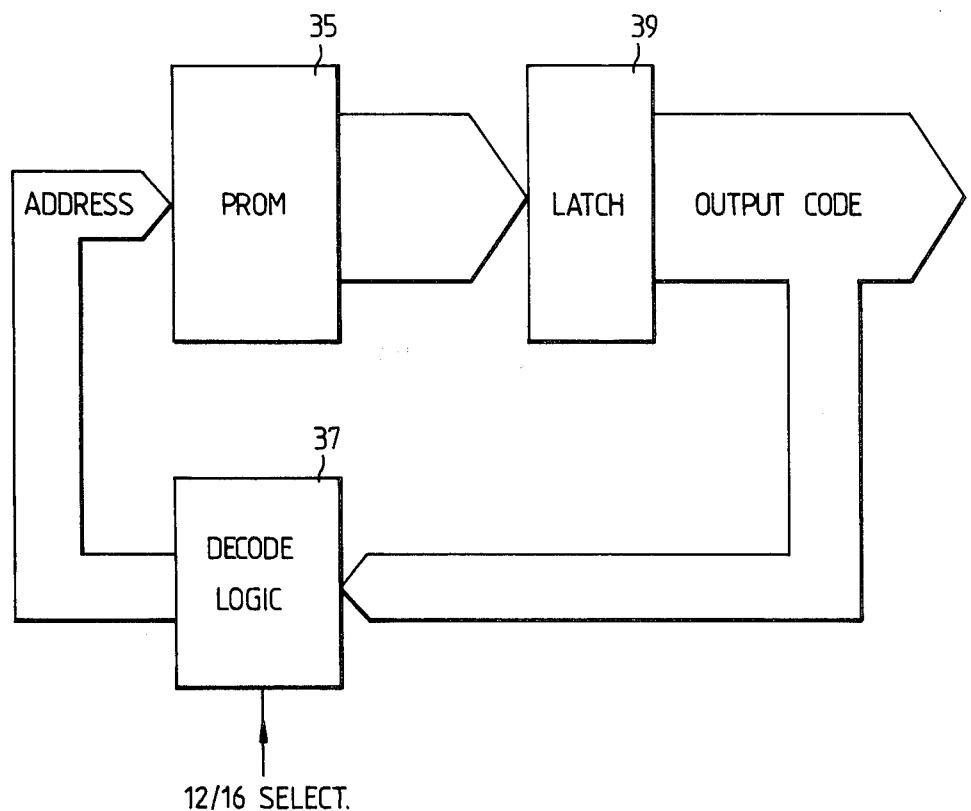
FIG. 6 is a schematic diagram of a staircase generator for the y deflection signal.

FIG. 6 shows schematically the generation of the staircase waveform. A self-addressing PROM 35 holds the output codes which correspond to the sixteen vertical levels in the swathe. Part of the output code is fed back, via a decode logic circuit 37, to form the PROM address. Hence the sequential generation of the staircase levels is performed automatically. A latch circuit 39 on the PROM outputs enables the codes to change at the correct time. The decode logic circuit 37 is in fact used only where a 12 detector array may be interchanged with the described 16 detector array amd is otherwise redundant.

The 'swathe counter' (shown in FIG. 8, reference 55) which generates the inter-swathe waveform also utilises a PROM but in a simpler configuration. Here the PROM stores the step levels required for the 10 swathes and is addressed by a 4-bit counter. The counter is clocked by a clock (swathe) pulse on line 56 and reset by a frame pulse on line 58.

Considering now the X-deflection generator, it can be seen from FIGS. 2 and 3 that the C.R.T. spot begins the first swathe at the L.H. side of the display and remains there for the duration of the first vertical staircase. During the vertical flyback period the spot moves to the right a distance equivalent to the detector column separation and remains there during the next vertical staircase. In the next flyback period the spot moves back to a point one pixel to the right of the original start point. This sequence is repeated throughout the swathe, with the spot moving gradually to the right and corresponding to the movement of the scanned image. The waveform required to implement this deflection and its relationship to the Y-deflection waveform is shown in FIG. 5(b).

The X-deflection waveform is generated digitally by successively adding and subtracting a pair of numbers. The count starts at zero and for the first (rightwards) movement a number, n, is added to the count, where n is the number of pixels equivalent to the detector column separation. For the next (leftwards) movement a number, n-1, is subtracted from the count to leave the spot one pixel to the right of the start point. This is repeated throughout the swathe. In order to subtract n-1 from the count, the complement, n-1 is added. Hence the operation reduces to a sequential adding of two preset numbers to the previous count. This process is shown schematically in FIG. 7. A Data Selector 41 is controlled by "select" and "strobe" lines 45 and 47, to select either the "+ve count" or "−ve count". The "select" line carries a "0" for an addition and a "1" for a subtraction. The "+ve count" comprises a 4-bit positive number applied to the data selector 41. The "−ve count" comprises the complement of: this number minus one, also a 4-bit number. The '0' or '1' on the select line 45 selects the positive or negative counts respectively for use as the least significant bits (LSB's) of a 10-bit word. The remaining 6-bits are all '0's' for an addition and all '1's' for a subtraction and again the choice is made by the select line. The resulting positive or negative 10-bit word (word A) is added in a 10-bit adder 43 to the previous count (word B). The result is passed to a 10-bit latch 49 for extraction at the appropriate time, the output being fed back to the 10-bit adder 43 as the 'previous count' word B.

In order to ensure correct synchronisation between the X and Y waveforms, the "strobe" and "select" lines are derived from the Y "staircase generator" PROM.

Figure 8:
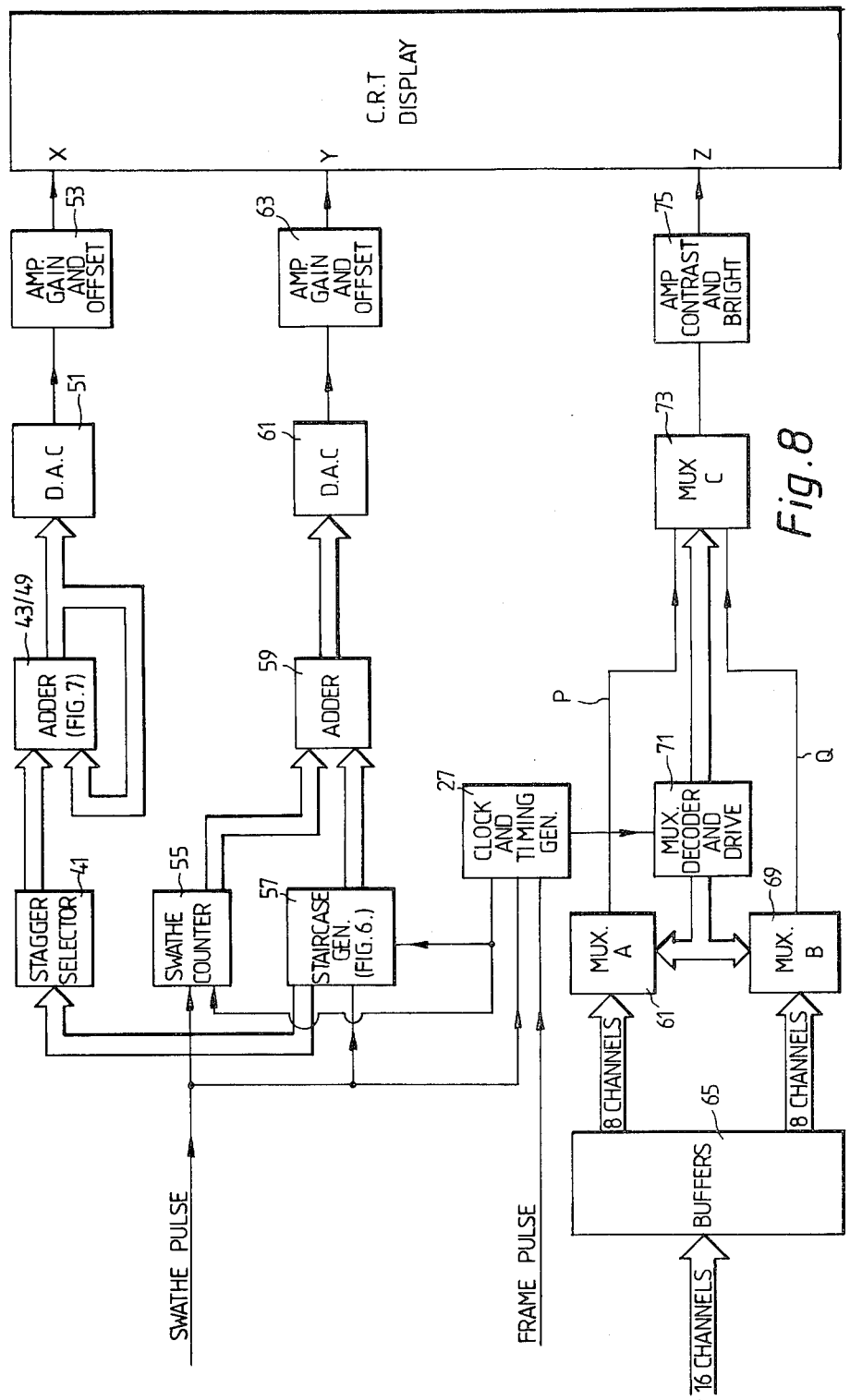
FIG. 8 is a more detailed block diagram of the scan converter part of the image conversion system.

Referring now to FIG. 8, this shows the assembled scan conversion circuitry of FIG. 4 but in greater detail. The swathe pulse (56) and the frame pulse (58) are derived directly from the thermal image I.R. scanner. The staircase generator 57 (shown in FIG. 6) provides the signal of FIG. 5(a) to an adder circuit 59. A swathe counter 55 provides the inter-swathe step waveform (not shown) and the two waveforms are combined in adder 59 to provide a digital Y deflection signal. This is converted to an analogue signal in digital/analogue converter 61 and applied to a scaling and offset amplifier 63 for application to the C.R.T.

Figure 7:
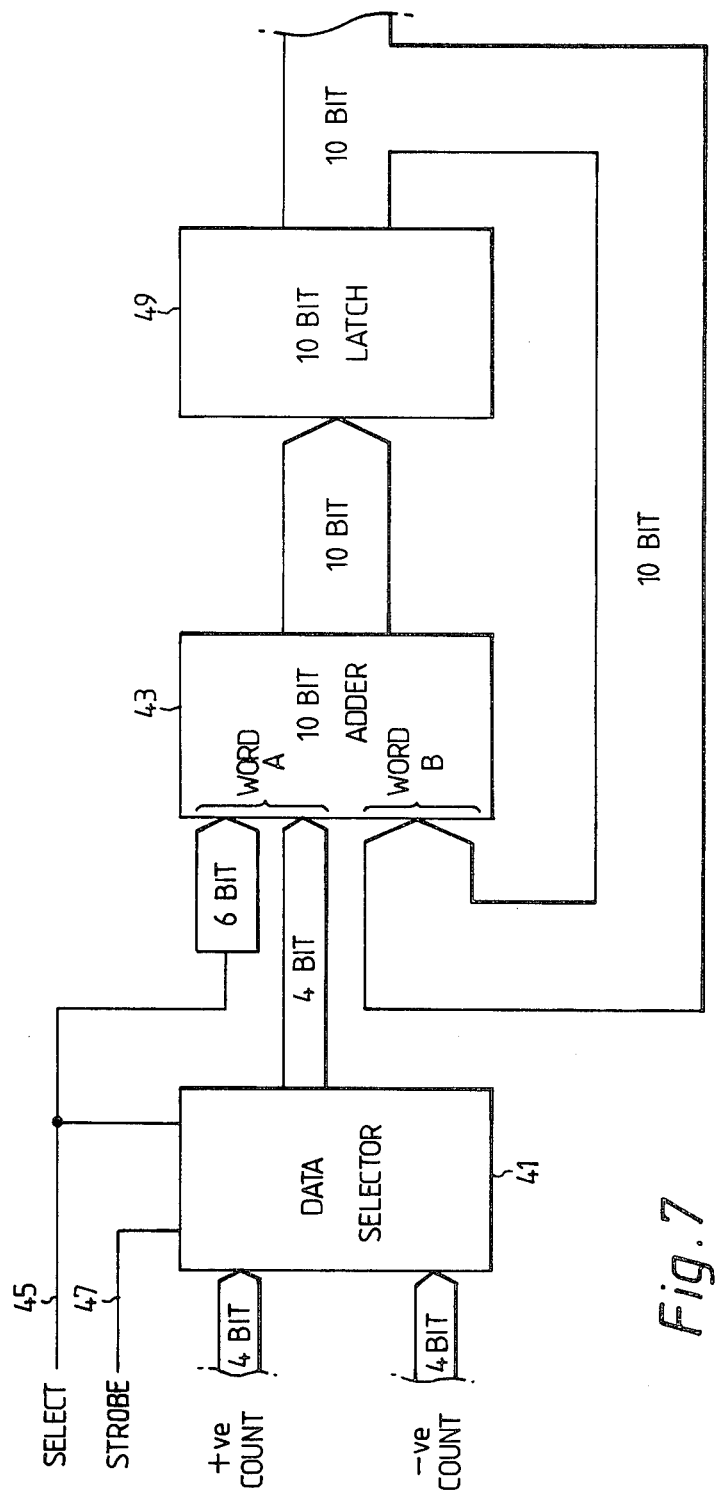
FIG. 7 is a similar diagram for the X deflection signal.

The X deflection circuit includes the positive/negative stagger selector 41 and the feedback adder circuit 43/49 of FIG. 7. The resulting waveform of FIG. 5(b) is applied to the C.R.T. by way of a digital/analogue circuit 51 and a scaling and offset amplifier 53.

The Z drive circuitry is required to convert the sixteen parallel channels of analogue information into a form suitable for displaying on a single channel display. It consists of 16 buffer amplifiers 65, a 16-1 multiplexer network 67, 69 71 and 73 and an output scaling amplifier 75.

The buffers 65 are used to interface the thermal imager signal channels to the scan converter. This is done in order to prevent interaction between the imager and scan converter and to match the dynamic range and voltage levels of the imager to those required by the multiplexer.

There are sixteen identical buffers, each consisting of a non-inverting amplifier with a "preset" adjustable gain to facilitate channel balancing. An adjustable voltage offset generator is also provided, and is common to all channels. This allows the signal "window" to be accommodated within the multiplexer dynamic range, and also acts as a rudimentary brightness control. The buffer outputs are also diode clamped to ensure that only positive voltages are applied to the multiplexer.

The operation of the timing generator and the multiplexer is determined by the system parameters which in turn are dictated by the thermal imager parameters. In the particular embodiment described, these are as follows.

| | |
|---|---|
| Frame time | = 40 mS |
| No. of swathes | = 10 |
| ∴ Swathe time | = 4 mS |
| Scan efficiency | ≈ 50% |
| ∴ Active swathe time | ≈ 2 mS |
| No. of display lines | = 160 |
| Aspect ratio of display | = 2:1 |
| ∴ No. of picture elements per line | = 320, and for convenience is made equal to 512. |
| ∴ Multiplexer cycle time | = 2 mS/512 = 3.9 μS |

One multiplex cycle consists of 16 channel samples plus two blanking periods, totalling 18 channel sample times.

| | |
|---|---|
| Therefore multiplex sample time | = 3.9 μS/18 = 217 nS |
| Therefore necessary clock frequency | = 4.608 MHz |

Actual crystal frequency is 9.216 MHz.

Figure 9:
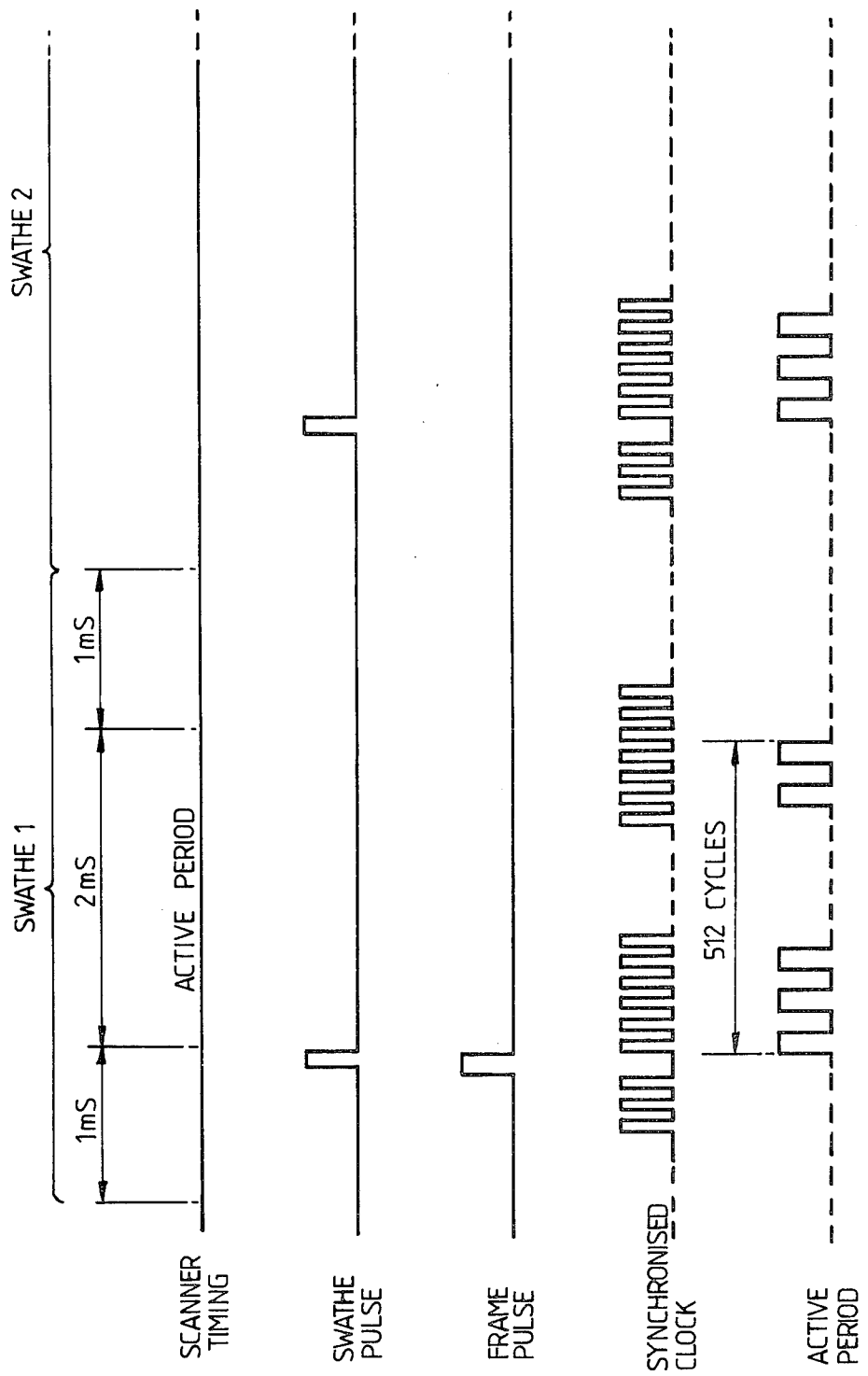
FIG. 9 is a timing diagram for the scan conversion circuit.

The timing generator produces all the timing waveforms for the correct operation of the scan converter, as shown in FIG. 9.

All the necessary clock waveforms for the scan converter electronics are derived from a 9.216 MHz crystal. The swathe pulse is used to synchronise the crystal output to ensure that a full clock cycle is obtained at the start of the swathe. This synchronised clock is divided by 2 to generate the clock for the staircase generator and for the multiplex sequencer. This 4.608 MHz clock is further divided by 2 to drive Multiplexer C (73 in FIG. 8). A preset counter is used to ensure that the multiplexers are only active for 512 cycles, equivalent to the active part of the swathe period.

In order to minimise the high speed multiplexing required, a two-tier system is used. The first multiplexing stage is carried out by four 4-channel multiplexers, connected in pairs to produce two 8-bit multiplexers A and B of FIG. 8. The outputs of the two 8-bit multiplexers are then sampled alternately by multiplexer C. Buffer amplifiers have been provided, (not shown) between the first and second multiplex stages in order to prevent interaction between the multiplexers. The buffers make a marginal improvement in the performance.

As well as sampling each of the sixteen signal channels in each multiplex cycle, the multiplexer provides the video blanking during the flyback between vertical staircases and during the scanner dead time. This is achieved by making all the multiplexer switches open-circuit so that the output lines P and Q are clamped to OV.

The multiplexing sequence is such that the odd lines are sampled first, followed by blanking and then by the even lines and blanking again. This is produced by sampling P and Q alternately.

The multiplexer sequence code is obtained from a self-addressing PROM arrangement similar to that of the "staircase generator" of FIG. 6.

We claim:

1. A scan conversion circuit for generating scanning signals for a cathode ray tube (C.R.T.) display from timing information and output signals generated by a two-dimensional array of detector elements scanned over a field of view in a serial parallel mode, said scan conversion circuit comprising:
    (a) a timing generator for receiving timing information from said scanned array,
    (b) a serial (X)-deflection circuit linked to said timing generator for supplying an X-deflection signal to said C.R.T. display,
    (c) a parallel (Y)-deflection circuit linked to said timing generator for supplying a Y-deflection signal to said C.R.T. display, and
    (d) means synchronized by said timing generator for supplying a brightness modulation signal to said C.R.T. display,
        (I) wherein said serial (X)-deflection circuit comprises means for generating a repeating waveform,
            (i) which waveform oscillates about a steadily increasing mean value, and
        (II) said parallel (Y)-deflection circuit comprises means for generating a substantially triangular stepped waveform,
            (i) having at least two periods per repeating unit of said repeating waveform for producing a scan pattern which is a high-speed trace of the pattern of said detector element array repeated a multiplicity of times within each serial scan of said array.

2. A scan conversion circuit according to claim 1, wherein the difference in level between the beginning and end of each said repeating unit of said repeating waveform generated by said serial (X)-deflection circuit is a small fraction of the difference between the maximum and minimum levels of each said repeating unit such that each successive serial displacement of said scanning pattern is a fraction of the distance in the X direction between adjacent rows of said detector elements.

3. A scan conversion circuit according to claim 2, wherein the peaks and troughs of successive periods of said substantially triangular stepped waveform alter in level by an amount sufficient to generate line interlacing in said scanning pattern.

4. A scan conversion circuit according to claim 1, wherein said serial (X) and parallel (Y)-deflection circuits incorporate digital means for generating said waveforms.

5. A scan conversion circuit according to claim 1, wherein said parallel (Y)-deflection circuit incorporates means for incrementing the Y deflection at the end of each sweep across said field of view so as to generate a plurality of adjacent swathes which cover the entire C.R.T. field.

6. An image converter for producing a C.R.T. raster scan signals representative of a field of view, said converter comprising:
    (a) an array of optical detector elements,
    (b) means for scanning an object field with said array in a parallel-serial mode,
    (c) a scan conversion circuit, said circuit comprising:
    (d) a timing generator for receiving timing information from said scanned array,
    (e) a serial (X)-deflection circuit linked to said timing generator, for supplying an X-deflection signal to said C.R.T. display,
    (f) a parallel (Y)-deflection circuit linked to said timing generator for supplying a Y-deflection signal to said C.R.T. display,
    (g) means synchronized by said timing generator for supplying a brightness modulation signal to said C.R.T. display,
    (h) wherein said serial (X)-deflection circuit comprises means for generating a repeating waveform,
    (i) which waveform oscillates about a steadily increasing mean value, and
    (j) said parallel (Y)-deflection circuit comprises means for generating a substantially triangular stepped waveform
        (i) having at least two periods per repeating unit of said repeating waveform for producing a scan pattern which is a high-speed trace of the pattern of said detector element array repeated a multiplicity of times within each serial scan of said array.

7. An image converter according to claim 6, further comprising an electrostatic C.R.T. converted to said scan conversion circuit to display said field of view.

8. An image converter according to claim 6, wherein said detector elements are sensitive to infra-red radiation.

* * * * *